(12) United States Patent
Kawanishi

(10) Patent No.: US 10,412,262 B2
(45) Date of Patent: Sep. 10, 2019

(54) INFORMATION PROCESSING APPARATUS AND METHOD OF CONTROLLING THE SAME

(71) Applicant: CANON KABUSHIKI KAISHA, Tokyo (JP)

(72) Inventor: Masaki Kawanishi, Toride (JP)

(73) Assignee: Canon Kabushik Kaisha, Tokyo (JP)

( * ) Notice: Subject to any disclaimer, the term of this patent is extended or adjusted under 35 U.S.C. 154(b) by 0 days.

(21) Appl. No.: 15/416,613

(22) Filed: Jan. 26, 2017

(65) Prior Publication Data

US 2017/0230537 A1    Aug. 10, 2017

(30) Foreign Application Priority Data

Feb. 10, 2016 (JP) ................................ 2016-023982

(51) Int. Cl.
*H04N 1/327* (2006.01)

(52) U.S. Cl.
CPC ....... *H04N 1/32776* (2013.01); *H04N 1/3278* (2013.01); *H04N 2201/0055* (2013.01); *H04N 2201/0082* (2013.01); *H04N 2201/3208* (2013.01)

(58) Field of Classification Search
USPC ................................................. 358/1.1–3.29
See application file for complete search history.

(56) References Cited

U.S. PATENT DOCUMENTS

| | | | | |
|---|---|---|---|---|
| 8,823,494 B1 * | 9/2014 | Kovitz | ................. | H01Q 1/2225 340/10.1 |
| 2014/0078550 A1 * | 3/2014 | Morita | ................. | G06F 3/1205 358/1.15 |
| 2014/0118778 A1 * | 5/2014 | Lee | ..................... | H04N 1/00127 358/1.15 |
| 2014/0273820 A1 * | 9/2014 | Narayan | ............ | H04W 76/023 455/41.1 |
| 2014/0370807 A1 * | 12/2014 | Lei | ......................... | H04W 4/21 455/41.2 |
| 2016/0156768 A1 * | 6/2016 | Kim | ....................... | H04L 67/12 455/420 |
| 2017/0171414 A1 * | 6/2017 | Naito | ................. | H04N 1/00973 |
| 2019/0020766 A1 * | 1/2019 | Omori | ..................... | H04N 1/00 |

FOREIGN PATENT DOCUMENTS

| | | |
|---|---|---|
| EP | 1 569 391 A2 | 8/2005 |
| JP | A 2005-244606 | 9/2005 |

* cited by examiner

*Primary Examiner* — Marcellus J Augustin
(74) *Attorney, Agent, or Firm* — Venable LLP

(57) ABSTRACT

A mechanism in which, even if a case in which an information processing apparatus has a plurality of methods for specifying an image forming apparatus to which to connect, a selection of the method and a selection of an alternative method for a case when specifying an image forming apparatus is not possible in a predetermined method are suitably executed is provided.

To accomplish this, an information processing apparatus sets destination information, searches for peripheral devices by using wireless communication, and if devices can be found, transmits the destination information to a device that the user selects from among the results of the search, and if a device could not be found, makes a recommendation to the user to use a reading function for reading a QR code in order to specify a transmission destination for the destination information.

9 Claims, 9 Drawing Sheets

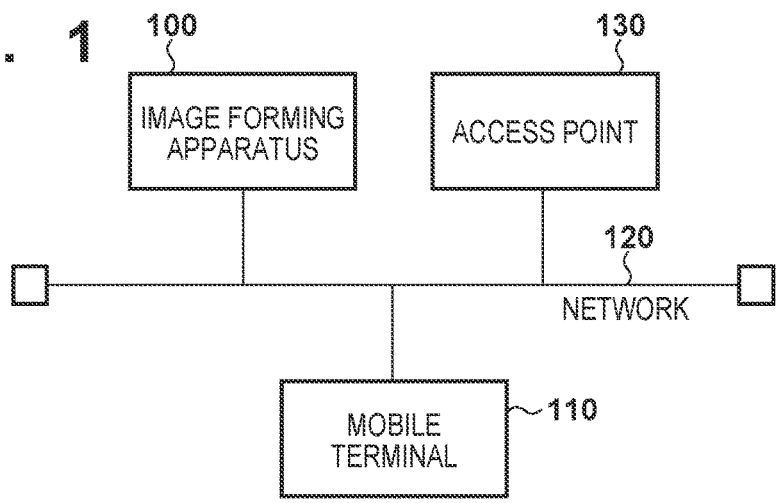
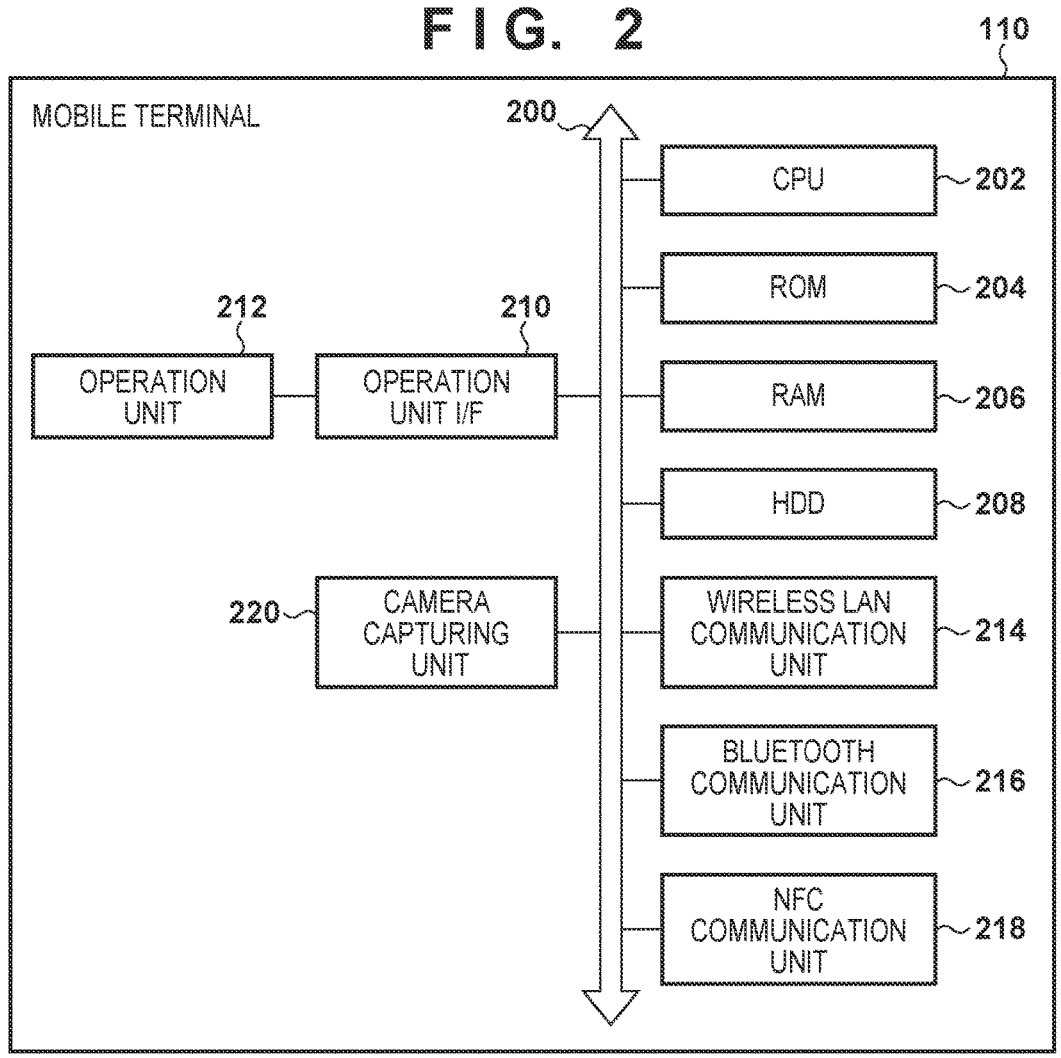

INFORMATION PROCESSING APPARATUS AND METHOD OF CONTROLLING THE SAME

BACKGROUND OF THE INVENTION

Field of the Invention

The present invention relates to an information processing apparatus capable of communication with an image forming apparatus and a method of controlling the same.

Description of the Related Art

There exist image forming apparatuses having a SEND function in which an original image is read by a scanner or the like, and the read image is attached to an electronic mail and transmitted. An address recorded in an address book of the image forming apparatus can be used for a destination to which to transmit. Also, for cases in which an address is not recorded to the address book, it is possible to use one that is input from a console unit that the image forming apparatus is equipped with. However, inputting from the console unit is often a burden for a user.

Meanwhile, it is possible to expect that convenience of the user will be improved if it is possible to use, for a destination of a SEND transmission, an address recorded in an address book of something outside of the image forming apparatus such as an information processing apparatus (a mobile terminal for example) or the like. In such a case, although it is necessary to transmit the address book that is in the mobile terminal to the image forming apparatus, in order to do that it is necessary to establish a connection with the image forming apparatus and transmit the address.

For connecting from the mobile terminal to the image forming apparatus, there exists a method in which the image forming apparatus that the mobile terminal connects to is specified and connection is performed by wireless communication. There exist mobile terminals that have a plurality of methods for connecting to image forming apparatuses by wireless communication. For example, there exists a method for searching for an image forming apparatuses that are near the mobile terminal by BLE (Bluetooth (registered trademark) Low Energy) and selecting the image forming apparatus to connect to from among these. Also, there exists a method in which a camera imaging function of the mobile terminal is used to read a bar code including information which specifies the image forming apparatus, and an image forming apparatus to connect to is selected. Furthermore, there exists a method in which an NFC touch is used to select an image forming apparatus to connect to in a case in which the image forming apparatus can use NFC (Near Field Communication).

In this way, although a user attempts to specify an image forming apparatus by one of the methods in a case when the mobile terminal has a plurality of specification methods, there are cases in which when specification is not possible due to some factor, an error termination occurs and connection with the image forming apparatus cannot be completed. For example, Japanese Patent Laid-Open No. 2005-244606 proposes an electronic device that outputs a message prompting so that setting is performed in a searchable state in a case when the image forming apparatus could not search by wireless communication.

However, there is a problem as is recited below in the foregoing conventional technique. For example, in the foregoing conventional technique, there are cases in which depending on the content of the outputted message, it is difficult to immediately solve the problem to be able to connect to the image forming apparatus. For example, it is possible to consider causes such as the case in which the wireless communication function that the image forming apparatus used is not supported, the case in which it cannot be used due to some function restriction, or the like. Although it is necessary to select the image forming apparatus by another method in such cases, it is difficult for a user to immediately understand what methods exist or what method should be selected and it is necessary for them to redo an operation from the start. In this way, it was cumbersome since there was the need to redo an operation from the start in the case where it was difficult for a user to select an appropriate specification method in a case in which an information processing apparatus such as a mobile terminal or the like had a plurality of specification methods, and an error termination occurred.

SUMMARY OF THE INVENTION

The present invention enables realization of a mechanism in which even in a case in which an information processing apparatus has a plurality of methods for specifying an image forming apparatus to which to connect, a selection of the method and a selection of an alternative method for a case when specifying an image forming apparatus is not possible in a predetermined method are suitably executed.

One aspect of the present invention provides an information processing apparatus having a reading function for reading a QR code, the apparatus comprising: a search unit configured to search for devices by using Bluetooth Low Energy (BLE); a display unit configured to display a list screen listing devices that the search unit found; an obtainment unit configured to use BLE to obtain connection information for establishing a wireless LAN connection from a device that a user selected from the list screen, wherein the connection information includes an SSID; a wireless communication unit configured to, based on the obtained connection information, establish a wireless LAN connection between the information processing apparatus and the device that the user selected; and a control unit configured to recommend the user to specify a device using the reading function in a case when the search for devices by the search unit fails.

Another aspect of the present invention provides an information processing apparatus having a reading function for reading a QR code, the apparatus comprising: a reception unit configured to receive from a user a designation of a destination of image data; a search unit configured to search for a printing apparatus having a transmission function for transmitting image data; a display unit configured to display a list screen listing printing apparatuses that the search unit found; a transmission unit configured to transmit, to a printing apparatus that a user selected from the list screen, destination information indicating a destination that the reception unit received; and a control unit configured to recommend the user to specify a printing apparatus using the reading function in a case when the search for printing apparatuses by the search unit fails.

Still another aspect of the present invention provides a method of controlling an information processing apparatus having a reading function for reading a QR code, the method comprising: displaying a list screen listing devices that the information processing apparatus found by using BLE; controlling the information processing apparatus to obtain, from a device that a user selected from the list screen, connection information for establishing a wireless LAN connection, wherein the information processing apparatus obtains the connection information by using BLE, and the connection information includes an SSID; controlling the information processing apparatus, based on the connection information that the information processing apparatus obtained, to establish a wireless LAN connection between the information processing apparatus and the device that the user selected; and recommending the user to specify a device using the reading function in a case when the search for devices using BLE fails.

Yet still another aspect of the present invention provides a method of controlling an information processing apparatus having a reading function for reading a QR code, the method comprising: receiving from a user a designation of a destination of image data; displaying a list screen listing printing apparatuses having a transmission function for transmitting image data that the information processing apparatus found; controlling the information processing apparatus to transmit destination information indicating a destination received from the user to the printing apparatus selected by the user from the list screen; and recommending the user to specify a printing apparatus using the reading function in a case when the search for printing apparatuses fails.

Further features of the present invention will be apparent from the following description of exemplary embodiments with reference to the attached drawings.

BRIEF DESCRIPTION OF THE DRAWINGS

FIG. 1 is a network configuration diagram.

FIG. 2 is a block diagram illustrating a main configuration of an information processing apparatus.

DESCRIPTION OF THE EMBODIMENTS

Figure 3:
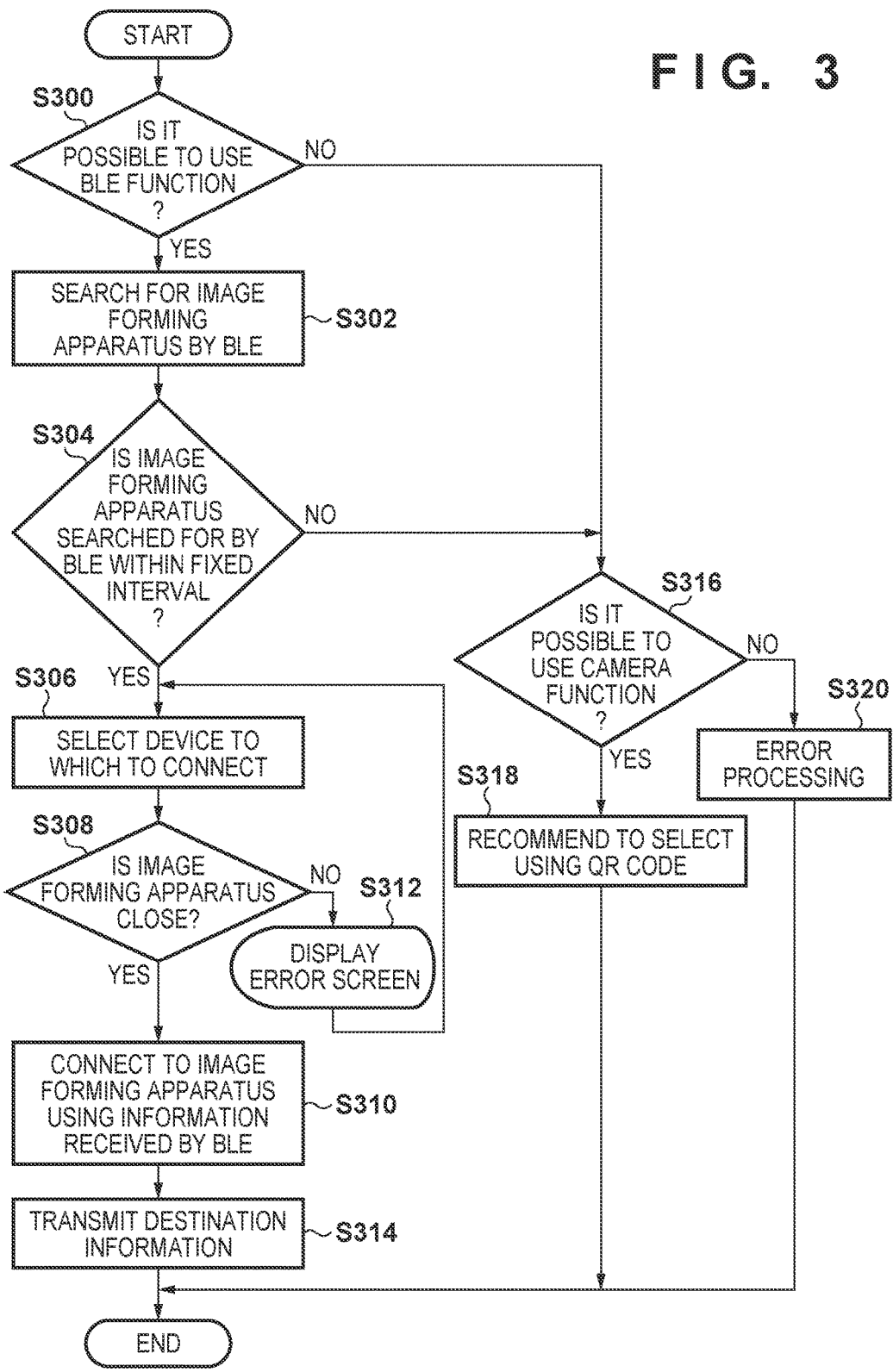
FIG. 3 is a flowchart in which a selection from a QR code (registered trademark) is recommended.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Network Configuration of a System>

Below, description will be given for a first embodiment of the present invention. Firstly, description will be given regarding a network configuration of a system according to embodiments with reference to FIG. 1. In the present embodiment, description will be given for one example of a mobile terminal 110 as an information processing apparatus.

In the present system, an image forming apparatus 100, the mobile terminal 110, and an access point 130 are connected via a network 120. Accordingly, the access point 130 and the image forming apparatus 100 can communicate with the mobile terminal 110 via the network 120. Also, the mobile terminal 110 and the image forming apparatus 100 are equipped with a wireless direct communication function and can directly communicate without going through the network 120. The image forming apparatus 100 has a transmission function for transmitting image data and the like that is read from an original to an external apparatus. The mobile terminal 110 transmits print data to the image forming apparatus 100 and the image forming apparatus 100, having received the print data, interprets the received print data and executes print processing.

<Information Processing Apparatus Configuration>

Next, description will be given regarding a main example of a configuration of the mobile terminal 110 which is one example of an information processing apparatus with reference to FIG. 2. The mobile terminal 110 is equipped with a CPU 202, a ROM 204, a RAM 206, an HDD 208, an operation unit I/F 210, an operation unit 212, a wireless LAN communication unit 214, a Bluetooth (registered trademark) communication unit 216, an NFC communication unit 218, and a camera imaging unit 220.

The CPU 202 reads a control program that the ROM 204 records and executes various processing for controlling operations of the mobile terminal 110. The CPU 202 is connected to other units by a bus 200. The ROM 204 records control programs. The RAM 206 is used as a main memory of the CPU 202 and as a temporary storage area of a work area or the like. The HDD 208 records various data such as images. Also, a later described OS (Operating System) 1304 and a printing application 1300 are also recorded in the HDD 208.

The operation unit I/F 210 connects the operation unit 212 and the bus 200. The operation unit 212 is equipped with a software keyboard and a liquid crystal display unit which has a touch panel function, and displays various screens. The user can input instructions and information to the mobile terminal 110 via the operation unit 212. The wireless LAN communication unit 214 executes wireless communication by wireless LAN with an external apparatus such as the access point 130. The Bluetooth communication unit 216 executes wireless communication by Bluetooth with an external apparatus such as the image forming apparatus 100. The NFC communication unit 218 executes short distance wireless communication by NFC (Near Field Communication) with an external apparatus such as the image forming apparatus 100. The camera imaging unit 220 images an image by a camera function.

<Software Configuration>

Figure 5:
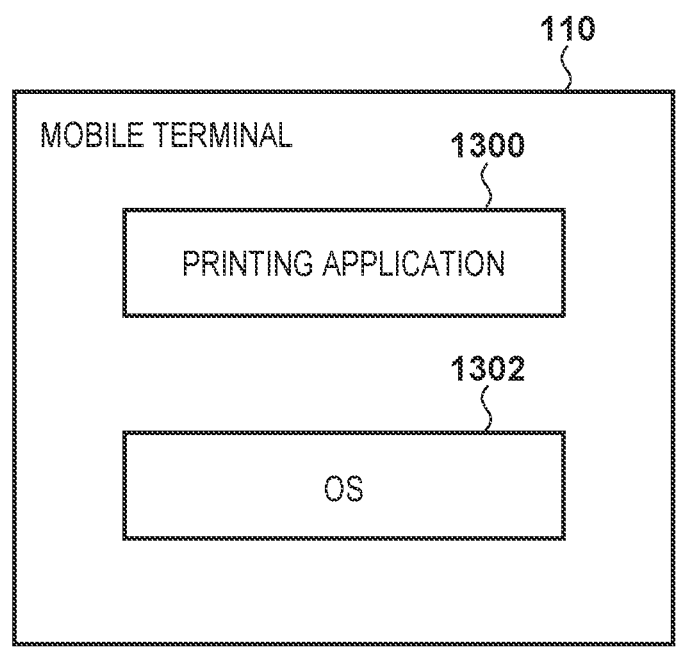
FIG. 5 is a block diagram illustrating a software configuration.

Next, description will be given regarding a software configuration of the mobile terminal 110 with reference to FIG. 5. The mobile terminal 110 is equipped with the printing application 1300 and an OS 1302 as a software configuration. These are functional blocks of software realized by the CPU 202 reading a control program that is recorded in the ROM 204.

The OS 1302 is software for comprehensively controlling operation of the entirety of the mobile terminal 110. It is possible to install various applications including the later described printing application 1300 in the mobile terminal 110. The OS 1302 exchanges information with these applications, and according to an instruction received from an application, changes a screen displayed on the operation unit 212, and executes wireless communication by the wireless LAN communication unit 214.

The printing application 1300 is an application installed on the mobile terminal 110. The printing application 1300 can obtain connection information for connecting to the image forming apparatus 100 by wireless LAN via the NFC communication unit 218 and input a print job to the image forming apparatus 100 via the connection after connecting. Furthermore, the printing application 1300 can execute a wireless communication by wireless LAN with an external apparatus via the wireless LAN communication unit 214. For example, it is possible to access the wireless LAN through the access point 130, perform communication with the image forming apparatus 100 via the access point 130, and input a print job and the like.

In the present embodiment, description will be given regarding an example in which the printing application 1300 transmits a destination to the image forming apparatus 100 from the mobile terminal 110. Although description is given by an example of an electronic mail address as the type of the destination, the present invention is not limited to this. For example, a file server address or the like may also be used as the destination.

<Setting Screen>

Figure 4A:
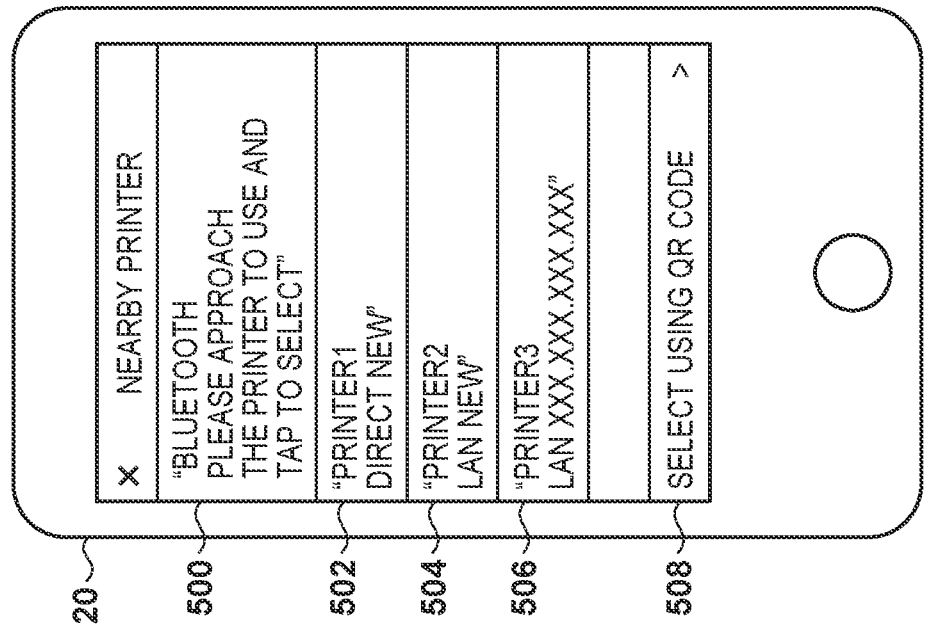
FIGS. 4A-4D are diagrams illustrating examples of screens.

Next, description will be given regarding a setting screen 10 with reference to FIG. 4A. The setting screen 10 is a screen that the printing application 1300 displays on the operation unit 212 in order to transmit the destination from the mobile terminal 110.

Reference numeral 400 is an address field (To) of an electronic mail and a field for inputting an electronic mail address (To). Reference numeral 402 is button for displaying a screen (not shown) for selecting an address within an address book saved in the mobile terminal 110. Reference numeral 404 is an address field (Cc) of an electronic mail and a field for inputting an electronic mail address (Cc). Reference numeral 406 is button for displaying a screen (not shown) for selecting an address within an address book saved in the mobile terminal 110.

Reference numeral 408 is a subject field and is a field for inputting a subject of the electronic mail. Reference numeral 410 is a file name field and is a field for inputting a file path when attaching a file to the electronic mail. Reference numeral 412 is a body field and is a field for inputting a body of the electronic mail.

It is possible for a user to arbitrarily input by speech recognition or a software keyboard of the mobile terminal 110 for fields 400, 404, 408, 410, and 412. Reference numeral 414 is a transmit button for which destination information input in the fields 400, 404, 408, 410, and 412 is transmitted to the image forming apparatus 100.

<Processing Procedure>

Next, description will be given regarding a processing procedure when the transmit button 414 is pressed with reference to FIG. 3. The processing described below is realized by a program that executes the processing being loaded into the RAM 206 and executed by the CPU 202. In the present embodiment, when the image forming apparatus 100 is searched for based on Bluetooth wireless radio waves that the mobile terminal 110 receives but cannot be found, selection by a QR code is recommended.

In step S300, the CPU 202 determines whether or not a function by which the mobile terminal 110 transmits/receives Bluetooth wireless radio waves can be used. In a case when it can be used the processing advances to step S302, and in a case when it cannot be used the processing advances to step S316. For example, the printing application 1300 executed by the CPU 202 makes a query to the OS 1302 as to whether or not the mobile terminal 110 has the Bluetooth communication unit 216 and determines that it cannot be used when the mobile terminal 110 does not have it. Also, the printing application 1300 may make a query to the OS 1302 as to whether or not a Bluetooth wireless communication function setting is enabled. In a case when it is enabled it is determined to be usable, and in a case when it is not enabled it is determined to be unusable.

In step S302, the CPU 202 uses BLE (Bluetooth Low Energy) as the image forming apparatus specification method (selection method) to search for an image forming apparatus which exists close to the mobile terminal 110, and advances to step S304. Specifically, the CPU 202 receives BLE Advertising packets via the Bluetooth communication unit 216. For example, the printing application 1300 obtains the foregoing information by querying the OS 1302 and searches for an image forming apparatus with which communication is possible by analyzing received Advertising packets.

In step S304, the CPU 202 determines whether or not the image forming apparatus could be found by BLE within a fixed interval. In a case when one could be found, the processing advances to step S306 and in a case when one cannot be found, the processing advances to step S316. In a case in which one can be found, the CPU 202 displays the results to the operation unit 212 via the operation unit I/F 210.

Figure 4B:
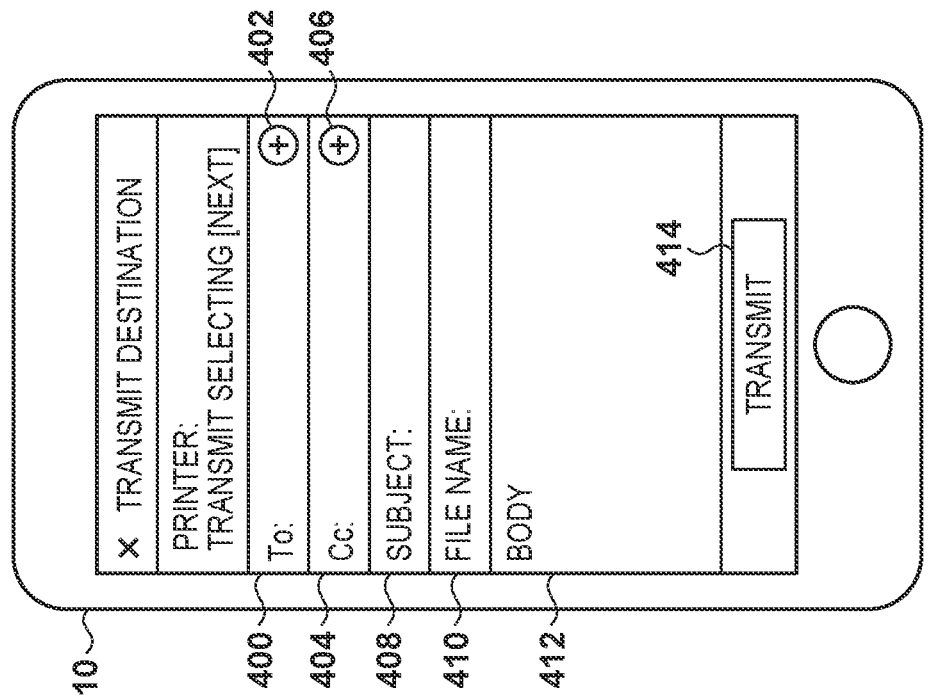

In reference numeral 20 of FIG. 4B, one example of a screen for when an image forming apparatus that is close to the mobile terminal 110 can be found by BLE is illustrated. For reference numeral 500, a message is displayed for connecting to the image forming apparatus by BLE. For reference numerals 502, 504, and 506, information of the image forming apparatuses that were found is displayed. In the screen 20, an example in which three image forming apparatuses (printers) were found is illustrated.

In the present embodiment, names of image forming apparatuses, connection methods (wireless direct connection or wireless LAN connection), whether there is past connection history (displaying the IP address when there is, new where there is not) are displayed as examples of information that is displayed (connection information). However, this is just one example, and information which indicates a radio field intensity of the image forming apparatus that is found and the like may be displayed for example.

Reference numeral 508 is a menu for selecting by a QR code. Although the image forming apparatus is searched for by BLE in the present embodiment, a later described case in which it is selected by a QR code is used. Note, although the image forming apparatuses from which BLE wireless radio waves are received are all listed in the present embodiment, control for displaying only image forming apparatuses whose radio field intensity is strong or the like may be performed. Hereinafter, description will be given assuming that PRINTER1, which is displayed as the reference numeral 502, is the image forming apparatus 100.

The description returns to FIG. 3. In step S306, the CPU 202 receives a result of performance of a selection of the image forming apparatus 100 via the operation unit I/F 210 by the user operating the operation unit 212, and advances the processing to step S308. In step S308, the CPU 202 determines whether or not the selected image forming apparatus 100 is positioned within a predetermined distance from the mobile terminal 110. In a case when it has been determined that it is positioned within the predetermined distance the processing advances to step S310, and in a case when it has been determined that it is not positioned within the predetermined distance the processing advances to step S312. Whether or not it is positioned within the predetermined distance is determined by a distance estimated from the received BLE radio field intensity. In step S312, the CPU 202 displays an error screen on the operation unit 212 via the operation unit I/F 210 and returns processing to step S306.

Performing determination in this way is for sufficiently ensuring quality in communication for inputting a print job or the like from the mobile terminal 110 after connecting to the image forming apparatus.

Figure 4D:
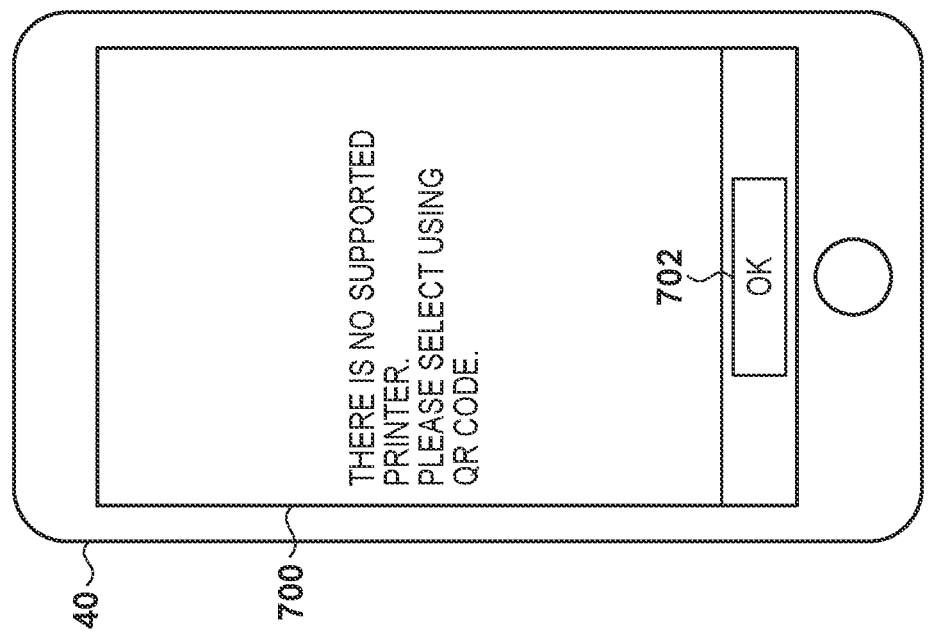
Figure 4C:
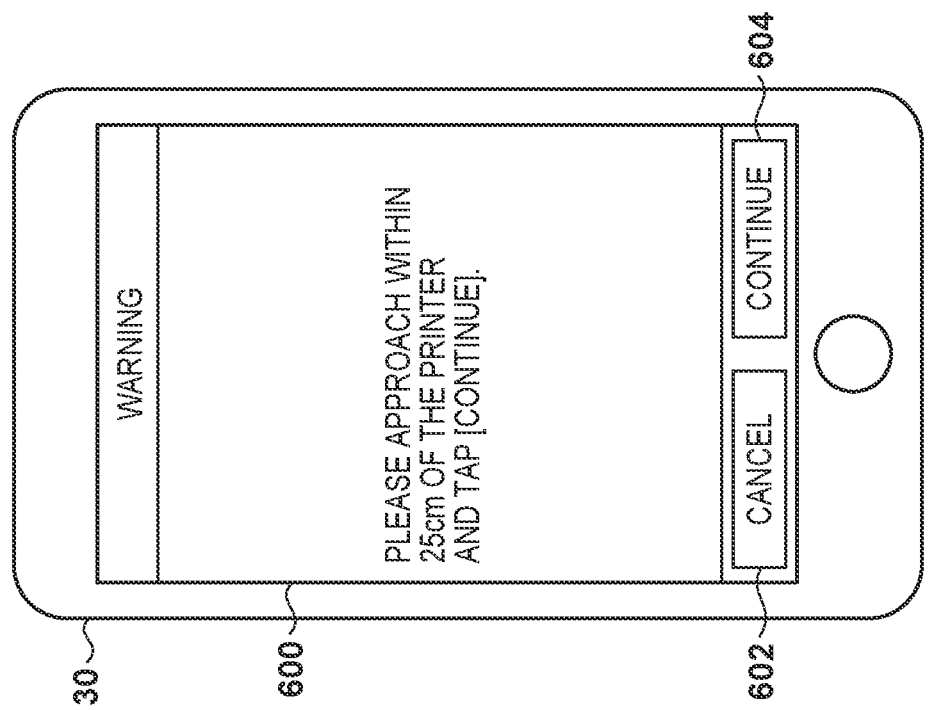

Reference numeral 30 of FIG. 4C illustrates one example of an error screen. Reference numeral 600 is a warning message. Reference numeral 602 is a cancel button and is used when a search for an image forming apparatus is to be cancelled. Reference numeral 604 is a continue button and, according to a warning message, continues a search for image forming apparatuses when it is pressed approached to within a predetermined distance from an image forming apparatus, for example a distance of approximately 25 cm. In the present embodiment, although determination of whether or not it is positioned within the predetermined distance is performed for approximately 25 cm, the present invention is not limited to this, and the determination may be for another optimal distance according to the capabilities of the mobile terminal 110. When the continue button 604 is pressed, the CPU 202 in step S308 measures the radio field intensity again and determines whether or not it is positioned within the predetermined distance.

In step S310, the CPU 202 connects to the image forming apparatus 100 based on information capable of specifying the image forming apparatus received by BLE and advances the processing to step S314. Here, the CPU 202 receives information for connecting to the image forming apparatus 100 by wireless LAN from the image forming apparatus 100 via the Bluetooth communication unit 216. Here, the information for connecting to the image forming apparatus 100 by wireless LAN is an SSID (Service Set Identifier), a password, or the like for example. Next, the printing application 1300 makes a request to the OS 1302 and connects to the image forming apparatus 100 via the wireless LAN communication unit 214 based on the received information.

In step S314, the CPU 202 transmits the destination information inputted by the setting screen 10 to the image forming apparatus 100 via the wireless LAN communication unit 214 and terminates the processing. The printing application 1300 makes a request to the OS 1302 and transmits the destination information to the image forming apparatus 100 via the wireless LAN communication unit 214.

Meanwhile, in a case when it is determined that the BLE function cannot be used in step S300 or in a case when it is determined that the image forming apparatus could not be found in step S304, the processing advances to step S316, and the CPU 202 determines whether or not the mobile terminal 110 can use a camera function. In a case when it can be used the processing advances to step S318 and in a case when it cannot be used the processing advances to step S320. For example, the printing application 1300 makes a query to the OS 1302 as to whether or not the mobile terminal 110 has the camera imaging unit 220 and determines that it cannot be used when it does not exist. Also, the printing application 1300 may make a query to the OS 1302 as to whether or not a camera function setting is enabled. In a case when it is enabled it is determined to be usable, and in a case when it is not enabled it is determined to be unusable.

In step S318, the CPU 202 displays a screen on the operation unit 212 via the operation unit I/F 210 for recommending a method for selecting by a QR code and terminates the processing. Reference numeral 40 of FIG. 4D illustrates one example of a screen for recommending a method for selecting by a QR code. Reference numeral 700 is a message for recommending selecting by a QR code. Reference numeral 702 is an OK button and is pressed when the user confirmed the contents. Although a display of the OK button 702 is performed in the present embodiment, a button for guidance to a function for selecting a QR code may be displayed.

In step S320, the CPU 202 performs error processing and terminates the processing. As one example, a message displaying that a search for an image forming apparatus has failed to the operation unit 212 via the operation unit I/F 210 may be displayed. Reference numeral 80 of FIG. 7D illustrates one example of an error screen that is displayed. Reference numeral 1400 is an error message. In the present embodiment, an instruction is made to turn on a setting menu ([Transmit Destination] for [App Settings]) of the printing application 1300. Because [Transmit Destination] is turned on, it becomes possible to avoid an error state by controlling so as to establish a connection in advance with the image forming apparatus 100, and controlling so as to transmit a destination to the image forming apparatus 100 with which the connection was established in advance when [Transmit Destination] is turned on. Reference numeral 1402 is an OK button and the user presses it when they confirm the contents. Note, configuration may be taken such that the error message 1400 prompts for a Bluetooth function to be enabled, prompts for a camera function to be enabled, or simply prompts for a review of a network setting. Also, although description is given by a display of an error message as one example of error processing, it may be other processing such as termination without displaying an error message. Note, description is given later regarding details of a method for selecting by a QR code.

As described above, the mobile terminal according to the present embodiment sets destination information, searches for a peripheral device by using wireless communication, and if devices can be found, transmits the destination information to a device that the user selects from among the results of the search. Meanwhile, if a device could not be found, the information processing apparatus makes a recommendation to the user to use a reading function for reading a QR code in order to specify a transmission destination for the destination information. By this, even in a case in which the mobile terminal 110 has a plurality of specification methods, it is not necessary for a user themselves to select the specification method, and even hypothetically if specification by the first specification method cannot be performed, it not necessary to select an alternative specification method. By this, even in a case when the user does not sufficiently have knowledge relating to wireless connection, they can easily make a wireless connection to an appropriate image forming apparatus can and will not be forced to perform complex operations.

Second Embodiment

Below, description will be given for a second embodiment of the present invention. For the present embodiment, description is omitted regarding control and configuration that is substantially similar to the foregoing first embodiment and description will be given for only different parts. In the present embodiment, description will be given of control in which when the image forming apparatus 100 is searched for based on Bluetooth wireless radio waves that the mobile terminal 110 receives but cannot be found, selection by a QR code is automatically performed.

Figure 6:
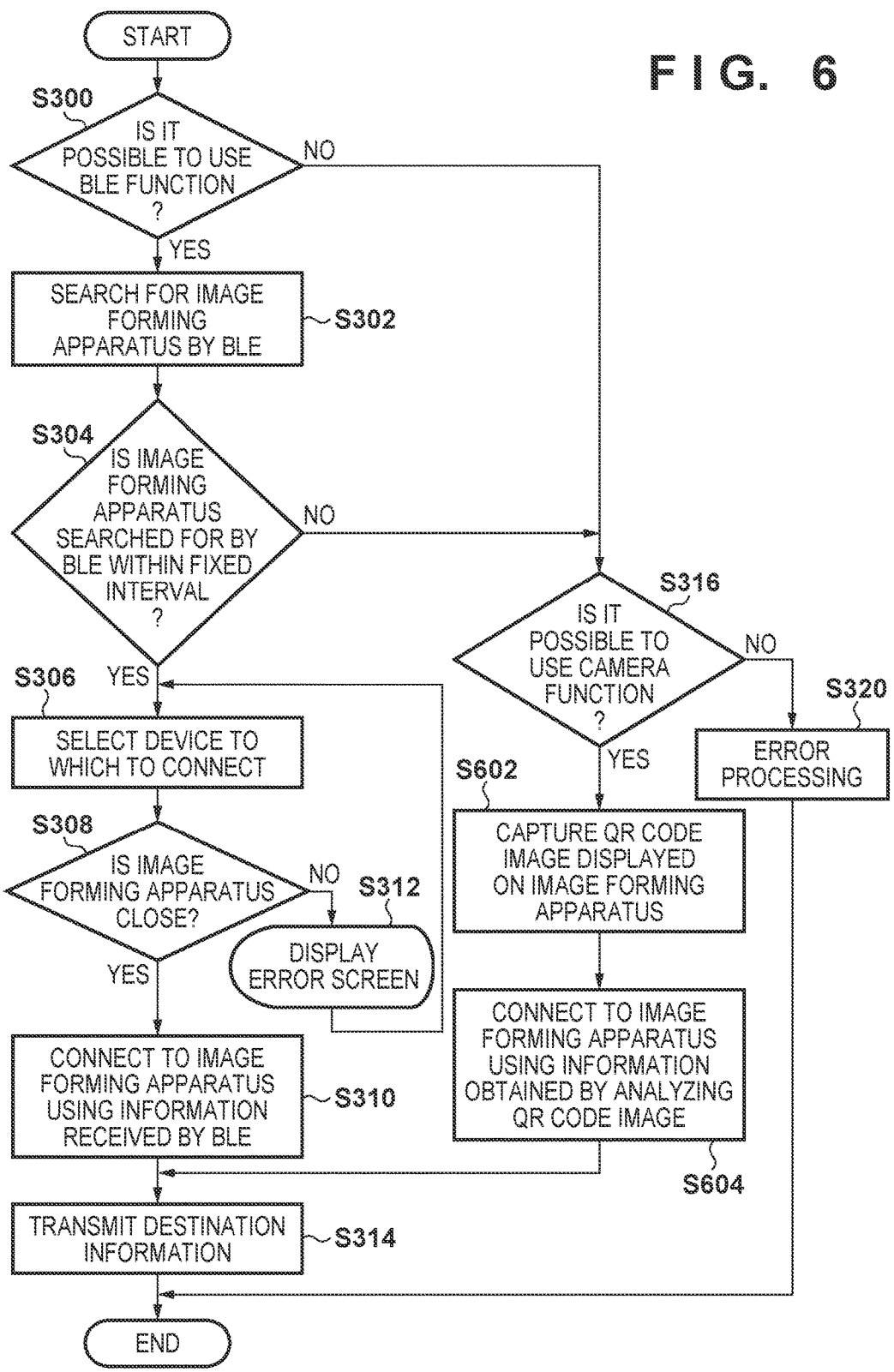
FIG. 6 is a flowchart in which a selection from the QR code is executed.

Next, description will be given regarding a processing procedure when the transmit button 414 is pressed with reference to FIG. 6. The processing described below is realized by a program that executes the processing being loaded into the RAM 206 and executed by the CPU 202. Note, the same processing as the flowchart of FIG. 3 is given the same step numbers so description thereof is omitted.

When it is determined that the camera function can be used in step S316, the processing advances to step S602, and the CPU 202 displays on the operation unit 212 via the operation unit I/F 210 a message for imaging a QR code image displayed on the image forming apparatus and advances the processing to step S604. Note that here, it is desirable that the CPU 202 activates the camera for imaging the QR code image. By this, the user may simply perform an operation of holding up the mobile terminal 110 to the display unit of the image forming apparatus on which the QR code is being displayed, and it is possible reduce the operation load of the user.

Figure 7A:
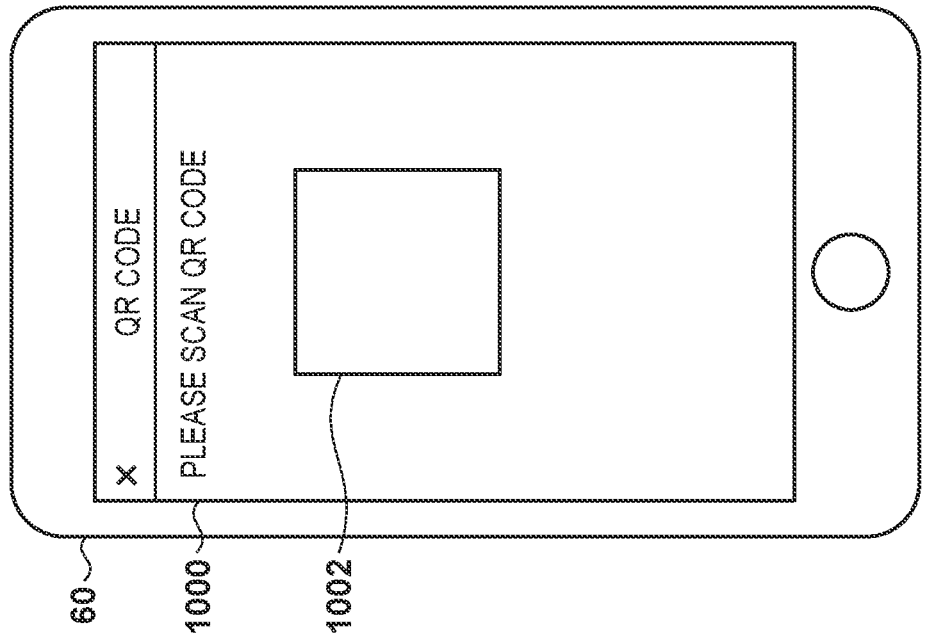
FIGS. 7A-7D are diagrams illustrating examples of screens.

Reference numeral 50 of FIG. 7A illustrates one example of a screen for instructing selection by QR code. Reference numeral 900 is a message illustrating a procedure for imaging the QR code image displayed on the image forming apparatus. Reference numeral 902 is a button for not displaying the message thereafter. If this button is selected, next time the display of the screen is skipped. Reference numeral 904 is a cancel button and is used for cancelling selection from a QR code. Reference numeral 906 is a continue button and is used for transitioning to a screen for imaging a QR code.

Figure 7B:
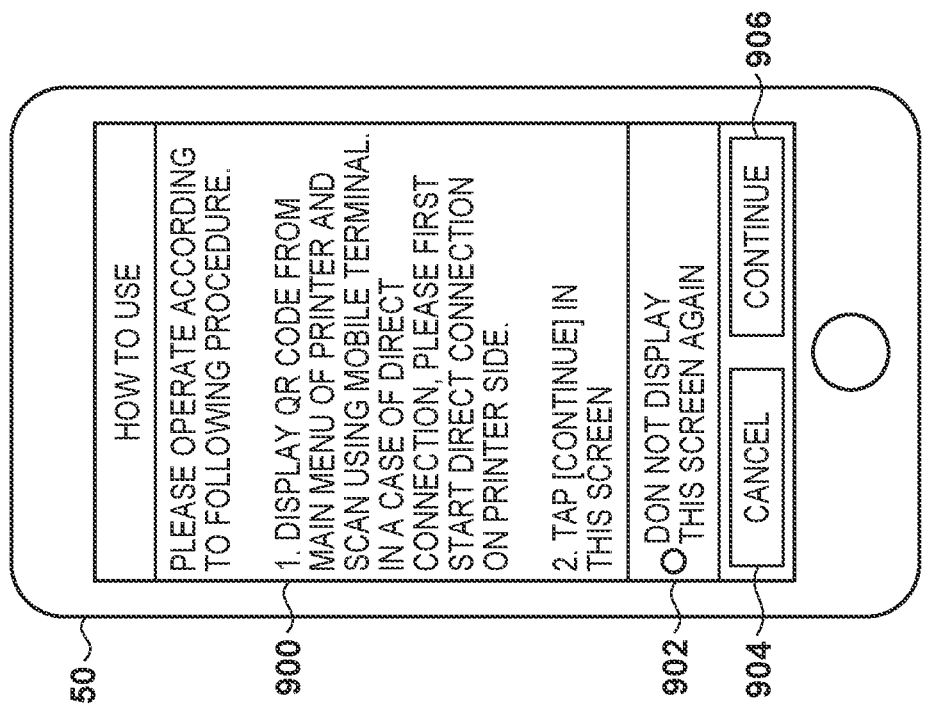
Figure 7D:
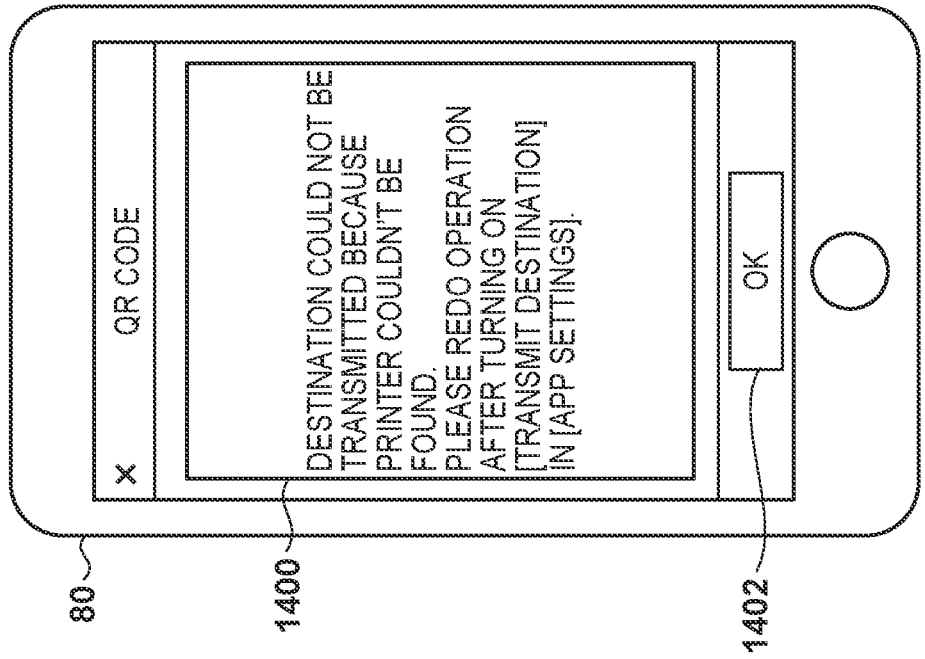

One example of a screen by which the CPU 202 reads a QR code that is displayed on the operation unit 212 via the operation unit I/F 210 when the continue button 906 on the instruction screen 50 is pressed is illustrated in reference numeral 60 of FIG. 7B. The present screen 60 is displayed by the printing application 1300 making a request to the OS 1302. Reference numeral 1000 is a message prompting the user to read a QR code. Reference numeral 1002 is a frame for reading a QR code image. The CPU 202 images via the camera imaging unit 220 the QR code displayed on the image forming apparatus 100. Note, the user operates an operation unit (not shown) of the image forming apparatus 100 and it is necessary that a QR code is displayed for imaging in advance. The image forming apparatus 100, according to an instruction from the user, generates a QR code which includes information for connecting to the image forming apparatus 100 by the wireless LAN and displays it on the operation unit of the image forming apparatus 100. Here, the information for connecting to the image forming apparatus 100 by wireless LAN is an SSID (Service Set Identifier), a password, or the like, for example.

Next, in step S604, the CPU 202 connects to the image forming apparatus 100 via the wireless LAN communication unit 214 based on information for which the imaged QR code image was analyzed and advances the processing to step S314. The printing application 1300 identifies an SSID, a password, or the like by analyzing the imaged QR code image, makes a request to the OS 1302 based on this information, and connects to the image forming apparatus 100 via the wireless LAN communication unit 214.

As described above, by virtue of the present embodiment, the second specification method is automatically executed rather than being limited to only recommending the second specification method as in the first embodiment described above. Note that in the present embodiment, the camera may be automatically activated and a screen for reading the QR code may be displayed, for example, for obtaining information of the image forming apparatus with which to perform the wireless communication by reading a QR code displayed on the display unit of the image forming apparatus 100 as the second specification method. By this, it is possible to further reduce operations of the user compared to the foregoing first embodiment. Note that configuration may be taken so as to control to set a function realized by the present embodiment and a function realized by the foregoing first embodiment by a user input.

Third Embodiment

Below, description will be given for a third embodiment of the present invention. For the present embodiment, description is omitted regarding control and configuration that is substantially similar to the foregoing first embodiment and description will be given for only different parts. In the present embodiment, when the image forming apparatus 100 is searched for based on Bluetooth wireless radio waves that the mobile terminal 110 receives but cannot be found, selection of an image forming apparatus by an NFC touch is recommended to the user.

Figure 8:
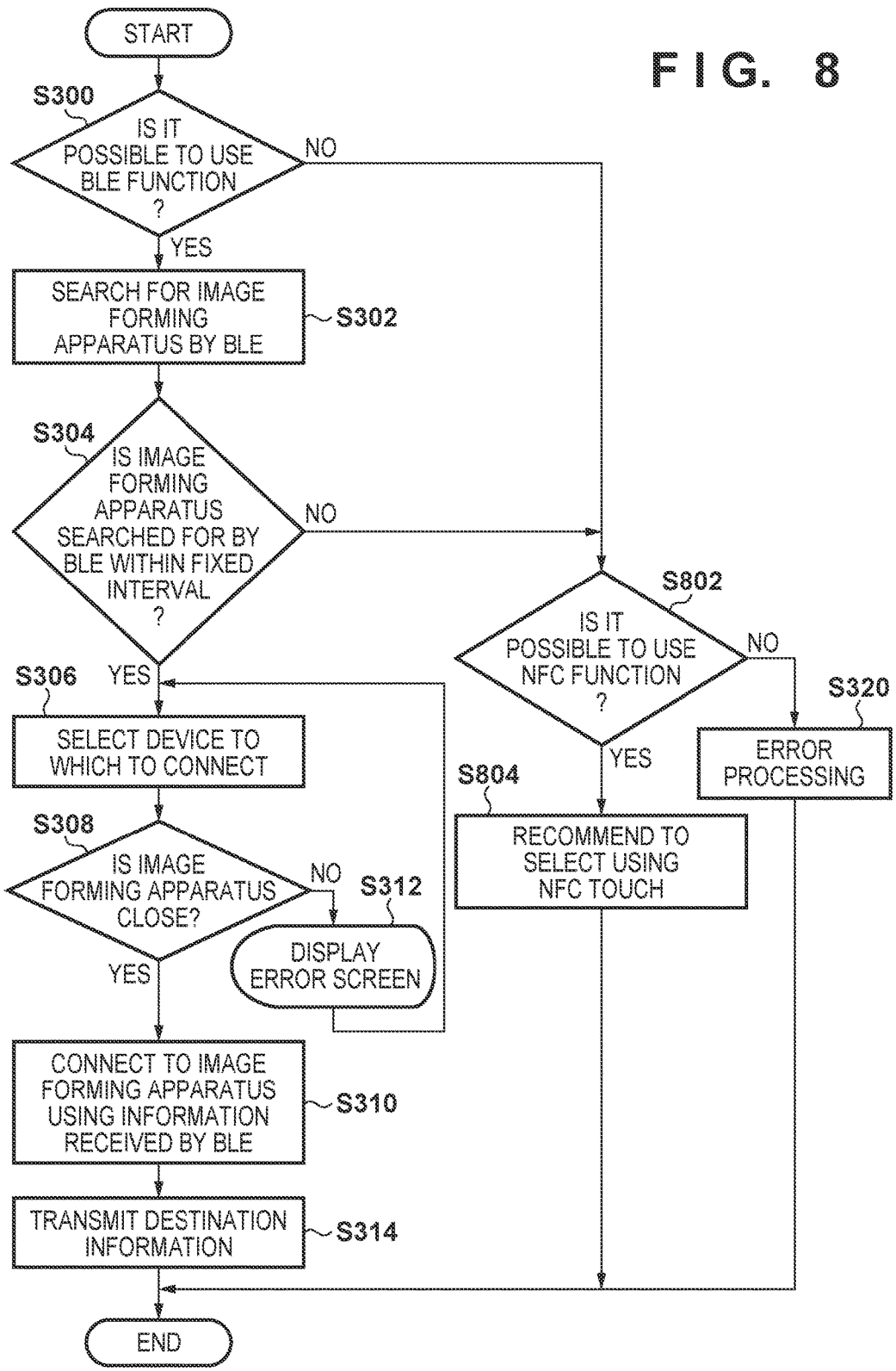
FIG. 8 is a flowchart in which a selection from an NFC touch is recommended.

Next, description will be given regarding a processing procedure when the transmit button 414 is pressed with reference to FIG. 8. For the processing described hereinafter is realized by a program for executing processing being loaded to the RAM 206 and executed by the CPU 202. Note, the same processing as the flowchart of FIG. 3 is given the same step numbers so description thereof is omitted.

In a case when it is determined that the BLE function cannot be used in step S300 or in a case when it is determined that the image forming apparatus could not be found in step S304, the processing advances to step S802, and the CPU 202 determines whether or not the mobile terminal 110 can use an NFC function. In a case when it can be used the processing advances to step S804 and in a case when it cannot be used the processing advances to step S806. For example, the printing application 1300 makes a query to the OS 1302 as to whether or not the mobile terminal 110 has the NFC communication unit 218 and determines that it cannot be used when it does not exist. Also, the printing application 1300 may make a query to the OS 1302 as to whether or not a NFC communication function setting is enabled. Here, in a case when it is enabled it is determined to be usable, and in a case when it is not enabled it is determined to be unusable. Meanwhile, in a case when the NFC function cannot be used, the processing advances to step S320 and the CPU 202 displays the error screen 80 as described above.

Figure 7C:
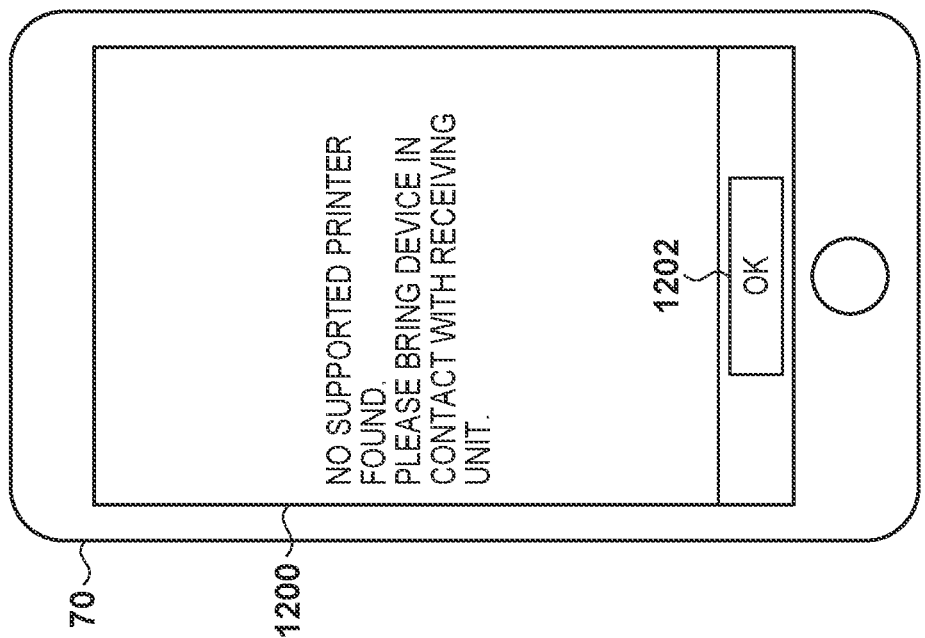

In step S804, the CPU 202 displays a screen on the operation unit 212 via the operation unit I/F 210 for recommending a method for selecting by the NFC touch and terminates the processing. Reference numeral 70 of FIG. 7C illustrates one example of a screen for recommending a method for selecting by an NFC touch. Reference numeral 1200 is a message recommending a selection from an NFC touch. Reference numeral 1202 is an OK button and the user presses it when they confirm the contents.

Note, in a case when the user touches the mobile terminal 110 to an NFC receiver unit (not shown) that the image forming apparatus is equipped with, the CPU 202 performs NFC communication through the NFC communication unit 218. The CPU 202 connects to the image forming apparatus 100 via the wireless LAN communication unit 214 based on information capable of specifying the image forming apparatus received by the NFC communication. Note, the image forming apparatus 100 prepares information for connecting to the image forming apparatus 100 by wireless LAN in an NFC tag that the image forming apparatus 100 is equipped with. Here, information for connecting to the image forming apparatus 100 by the wireless LAN is an SSID, a password, and the like for example.

The printing application 1300 makes a request to the OS 1302 based on information such as an SSID and a password obtained by the NFC communication and connects to the image forming apparatus 100 via the wireless LAN communication unit 214. When a connection with the image forming apparatus 100 is established, the CPU 202 transmits the destination information inputted by the setting screen 10 to the image forming apparatus 100 via the wireless LAN communication unit 214 and terminates the processing. The printing application 1300 makes a request to the OS 1302 and transmits the destination information to the image forming apparatus 100 via the wireless LAN communication unit 214.

As described above, by virtue of the present embodiment, unlike the methods for reading a QR code in the above described first and second embodiments, the image forming apparatus which performs the wireless communication is specified by a short distance wireless communication being performed with the image forming apparatus as the second specification method. In addition, the present invention is not limited to the above described embodiment, and various modifications are possible. For example, similarly to in the foregoing second embodiment, in the foregoing third embodiment, control may be taken such that processing for actually performing an NFC touch is transitioned to in addition to recommending a selection according to the NFC touch.

Furthermore, although description is given regarding control of the mobile terminal having the first specification method and the second specification method in the foregoing embodiments, the present invention is not limited to this and is also applicable to mobile terminals having more specification methods. In such a case, a priority order may be given to the specification methods by a setting or the like by the user and the specification methods may be performed in the priority order.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-023982 filed on Feb. 10, 2016, which is hereby incorporated by reference herein in its entirety.

What is claimed is:

1. An information processing apparatus comprising:
a memory; and
a processor in communication with the memory, the processor being configured to perform operations comprising:
searching for devices using a first wireless communication of a first wireless communication standard;
displaying devices found by the searching in a case where the devices are found by the searching using the first wireless communication;
selecting a device from the displayed devices based on an instruction by a user;
obtaining, via the first wireless communication from the selected device, connection information that is used for establishing a second wireless communication of a second wireless communication standard with the selected device;
establishing, based on that the connection information is obtained, the second wireless communication with the selected device using the obtained connection information;
determining, based on information obtained from an operating system of the information processing apparatus, whether or not a camera is usable;
displaying a screen for reading a two dimensional code using the camera of the information processing apparatus, in a case where no device is found by the searching using the first wireless communication and where it is determined that the camera is usable; and
displaying a message in a case where no device is found by the searching using the first wireless communication and where it is determined that the camera is not usable.

2. The information processing apparatus according to claim 1, wherein
the processor is configured to perform operations further comprising, in a case where no device is found by the searching using the first wireless communication and where it is determined that the camera is usable, automatically activating the camera.

3. The information processing apparatus according to claim 1, wherein
the processor is configured to perform operations further comprising, in a case where no device is found by the searching using the first wireless communication and where it is determined that the camera is usable, displaying a message illustrating a procedure for displaying the two dimensional code on a device.

4. The information processing apparatus according to claim 1, wherein
the first wireless communication is Bluetooth Low Energy (BLE) communication, and the second wireless communication is a wireless LAN communication wherein the obtained information is information indicating whether or not the information processing apparatus has the camera or information indicating whether a camera function is enabled or disabled, and in the determining, it is determined, based on the obtained information, whether or not the camera is usable.

5. A method of controlling an information processing apparatus comprising:

searching for devices using a first wireless communication of a first wireless communication standard;

displaying devices found by the searching in a case where the devices are found by the searching using the first wireless communication;

selecting a device from the displayed devices based on an instruction by a user;

obtaining, via the first wireless communication from the selected device, connection information that is used for establishing a second wireless communication of a second wireless communication standard with the selected device;

establishing, based on that the connection information is obtained, the second wireless communication with the selected device using the obtained connection information;

determining, based on information obtained from an operating system of the information processing apparatus, whether or not a camera is usable;

displaying a screen for reading a two dimensional code using the camera of the information processing apparatus, in a case where no device is found by the searching using the first wireless communication and where it is determined that the camera is usable; and displaying a message in a case where no device is found by the searching using the first wireless communication and where it is determined that the camera is not usable.

6. The method according to claim 5, further comprising, in a case where no device is found by the searching using the first wireless communication and where it is determined that the camera is usable, automatically activating the camera.

7. The method according to claim 5, further comprising, in a case where no device is found by the searching using the first wireless communication and where it is determined that the camera is usable, displaying a message illustrating a procedure for displaying the two dimensional code on a device.

8. The method according to claim 5, wherein the first wireless communication is Bluetooth Low Energy (BLE) communication, and the second wireless communication is a wireless LAN communication wherein the obtained information is information indicating whether or not the information processing apparatus has the camera or information indicating whether a camera function is enabled or disabled, and in the determining, it is determined, based on the obtained information, whether or not the camera is usable.

9. A non-transitory computer readable storage medium for storing a program for causing a computer to execute a method of controlling an information processing apparatus, the method comprising:

searching for devices using a first wireless communication of a first wireless communication standard;

displaying devices found by the searching in a case where the devices are found by the searching using the first wireless communication;

selecting a device from the displayed devices based on an instruction by a user;

obtaining, via the first wireless communication from the selected device, connection information that is used for establishing a second wireless communication of a second wireless communication standard with the selected device;

establishing, based on that the connection information is obtained, the second wireless communication with the selected device using the obtained connection information;

determining, based on information obtained from an operating system of the information processing apparatus, whether or not a camera is usable;

displaying a screen for reading a two dimensional code using the camera of the information processing apparatus, in a case where no device is found by the searching using the first wireless communication and where it is determined that the camera is usable; and displaying a message in a case where no device is found by the searching using the first wireless communication and where it is determined that the camera is not usable.

* * * * *